(12) United States Patent
Ogawa et al.

(10) Patent No.: US 12,062,000 B2
(45) Date of Patent: Aug. 13, 2024

(54) INFORMATION PROVIDING APPARATUS AND INFORMATION PROVIDING PROGRAM

(71) Applicant: LIXIL Corporation, Tokyo (JP)

(72) Inventors: Shoji Ogawa, Tokyo (JP); Hiroki Shigetomo, Tokyo (JP); Makoto Saruta, Tokyo (JP)

(73) Assignee: LIXIL Corporation, Tokyo (JP)

( * ) Notice: Subject to any disclaimer, the term of this patent is extended or adjusted under 35 U.S.C. 154(b) by 119 days.

(21) Appl. No.: 17/295,808

(22) PCT Filed: Aug. 27, 2019

(86) PCT No.: PCT/JP2019/033529
§ 371 (c)(1),
(2) Date: May 20, 2021

(87) PCT Pub. No.: WO2020/105241
PCT Pub. Date: May 28, 2020

(65) Prior Publication Data
US 2022/0027824 A1   Jan. 27, 2022

(30) Foreign Application Priority Data
Nov. 21, 2018   (JP) .................................. 2018-217891

(51) Int. Cl.
*G06Q 10/06* (2023.01)
*G06Q 10/0631* (2023.01)

(52) U.S. Cl.
CPC ................. *G06Q 10/06316* (2013.01); *G06Q 10/063114* (2013.01)

(58) Field of Classification Search
CPC .......................................... G06Q 10/00–90/00
See application file for complete search history.

(56) References Cited

U.S. PATENT DOCUMENTS

| | | | | |
|---|---|---|---|---|
| 9,524,632 B2 * | 12/2016 | Moore | ................. | G08B 21/245 |
| 2012/0303404 A1 * | 11/2012 | Nudd | ..................... | G06Q 10/06 |
| | | | | 705/7.15 |
| 2015/0088570 A1 * | 3/2015 | Yenni | ..................... | G06Q 10/06 |
| | | | | 705/7.15 |
| 2018/0341891 A1 * | 11/2018 | Setchell | ................. | G06Q 10/10 |

FOREIGN PATENT DOCUMENTS

| | | | | |
|---|---|---|---|---|
| CN | 101911108 A | * | 12/2010 | ............. G06Q 10/06 |
| CN | 106991498 A | | 7/2017 | |
| JP | 2003-67509 A | | 3/2003 | |
| JP | 2003-242230 A | | 8/2003 | |

(Continued)

*Primary Examiner* — Arif Ullah
(74) *Attorney, Agent, or Firm* — Morrison & Foerster LLP

(57) ABSTRACT

An information providing apparatus includes: a use status information acquirer that acquires information indicating use status of each of multiple toilet devices; a use status information provider that provides information indicating use status of each of the multiple toilet devices, acquired by the use status information acquirer; and a cleaning order provider that determines and provides order in which the multiple toilet devices are to be cleaned by a cleaning person, based on the use status of each of the multiple toilet devices.

21 Claims, 7 Drawing Sheets

(56) References Cited

FOREIGN PATENT DOCUMENTS

| | | | |
|---|---|---|---|
| JP | 2014014456 | * | 7/2012 |
| JP | 2014-173861 A | | 9/2014 |
| JP | 2017-146813 A | | 8/2017 |
| JP | 2017-212003 A | | 11/2017 |
| WO | WO-2018078181 A1 | * | 5/2018 |

* cited by examiner

INFORMATION PROVIDING APPARATUS AND INFORMATION PROVIDING PROGRAM

CROSS REFERENCE TO RELATED APPLICATIONS

This application is a national stage application under 35 USC 371 of International Application No. PCT/JP2019/033529, filed Aug. 27, 2019, which claims the priority of Japanese Application No. 2018-217891, filed Nov. 21, 2018, the entire contents of each of which are incorporated herein.

FIELD

The present disclosure relates to an information providing apparatus and an information providing program for providing information regarding a toilet.

BACKGROUND

Toilets are essential equipment both in houses where people live and in facilities used by people. Since toilets are equipment likely to cause dirt and odors, maintenance for keeping toilets clean is an important key to make houses and facilities into comfortable spaces. Particularly, appropriate maintenance of toilets installed in commercial facilities, amusement facilities, complex facilities, and facilities in passenger stations, for example, used by a great number of people may be required also in terms of public health.

PRIOR ART REFERENCE

Patent Literature

Patent Literature 1: Japanese Unexamined Patent Application Publication No. 2003-242230

SUMMARY

When a person from a cleaning company cleans toilets installed in a facility or the like during opening hours of the facility, the cleaning person cannot clean a toilet while a user is using the toilet, and a user cannot use a toilet while the cleaning person is cleaning the toilet. To improve the convenience of cleaning persons and users, there is a need for a technology for reducing such coincidence of timing.

The present disclosure has been made in view of such a problem, and a purpose thereof is to provide a technology for improving the convenience of persons who clean toilets or users of the toilets.

To solve the problem above, an information providing apparatus according to one aspect of the present disclosure includes: a use status information acquirer that acquires information indicating use status of each of multiple toilet devices; a use status information provider that provides information indicating use status of each of the multiple toilet devices, acquired by the use status information acquirer; and a cleaning order provider that determines and provides order in which the multiple toilet devices are to be cleaned by a cleaning person, based on the use status of each of the multiple toilet devices.

An information providing program according to another aspect of the present disclosure causes a computer to function as: a use status information acquirer that acquires information indicating use status of each of multiple toilet devices; a use status information provider that provides information indicating use status of each of the multiple toilet devices, acquired by the use status information acquirer; and a cleaning order provider that determines and provides order in which the multiple toilet devices are to be cleaned by a cleaning person, based on the use status of each of the multiple toilet devices.

An information providing program according to yet another aspect of the present disclosure causes a computer to function as: a use status information receiver that receives, from an information providing apparatus that provides information indicating use status of each of multiple toilet devices, the information indicating use status of each of the multiple toilet devices; a cleaning order receiver that acquires, from the information providing apparatus, information indicating order in which the plurality of toilet devices are to be cleaned by a cleaning person; and a display unit that displays, on a display device, the information indicating use status of each of the multiple toilet devices received by the use status information receiver, and the information indicating order in which the multiple toilet devices are to be cleaned received by the cleaning order receiver.

An information providing program according to still yet another aspect of the present disclosure causes a computer to function as: a use status information receiver that receives, from an information providing apparatus that provides information indicating use status of each of multiple toilet devices, the information indicating use status of each of the multiple toilet devices; a cleaning status information receiver that receives, from the information providing apparatus, information indicating a toilet device that is under cleaning or scheduled to be cleaned within a predetermined period of time; and a display unit that displays, on a display device, the information indicating use status of each of the multiple toilet devices received by the use status information receiver, and the information indicating a toilet device that is under cleaning or scheduled to be cleaned within a predetermined period of time received by the cleaning status information receiver.

Optional combinations of the aforementioned elements, and implementation of the present disclosure in the form of methods, apparatuses, systems, recording media, and computer programs may also be practiced as additional modes of the present disclosure.

The present disclosure provides a technology for improving the convenience of persons who clean toilets or users of the toilets.

BRIEF DESCRIPTION OF THE FIGURES

Embodiments will now be described, by way of example only, with reference to the accompanying drawings which are meant to be exemplary, not limiting, and wherein like elements are numbered alike in several Figures, in which.

DETAILED DESCRIPTION

Figure 1:
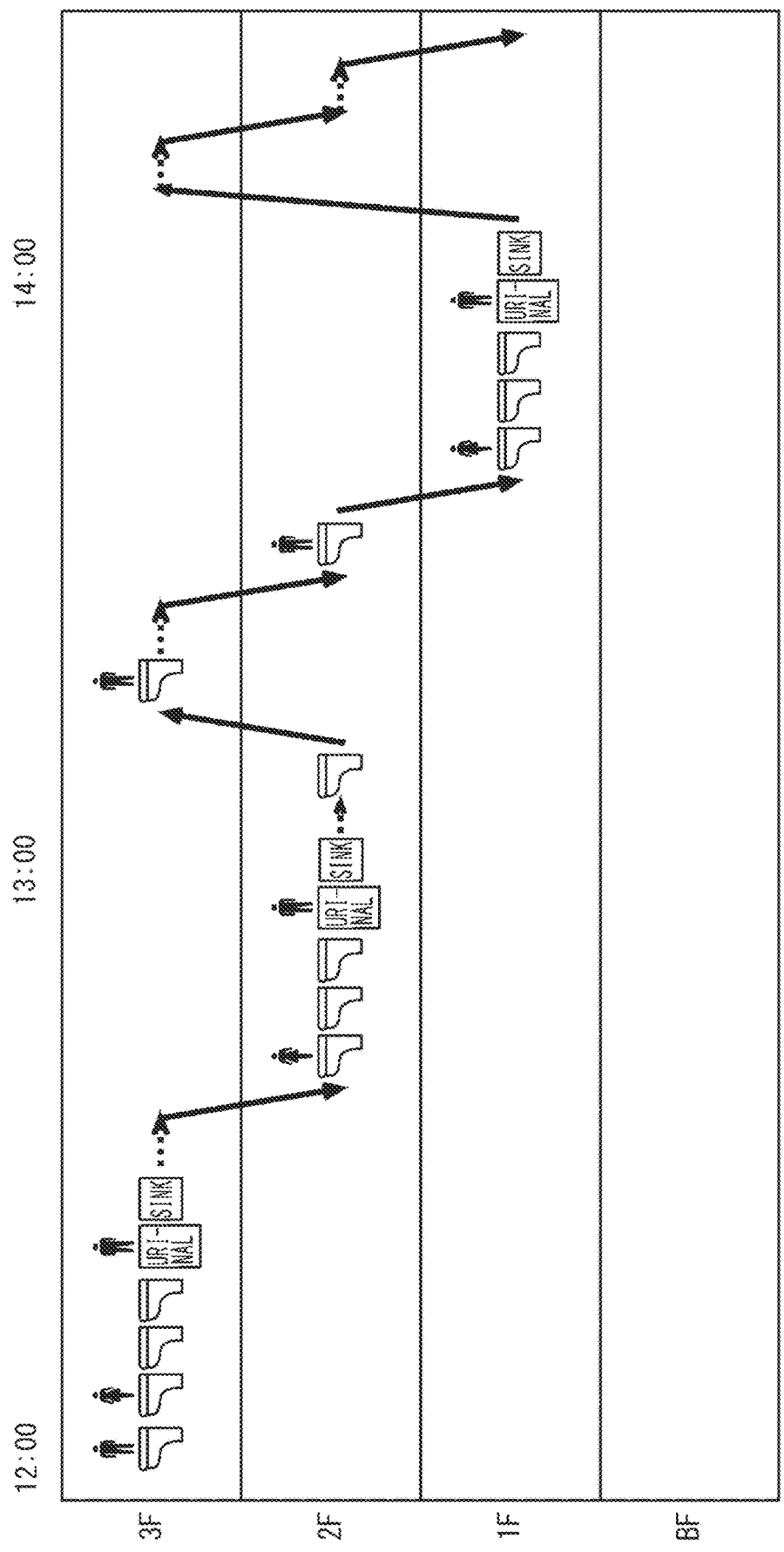
FIG. 1 is a diagram that schematically illustrates states of a cleaning person who cleans multiple toilet devices.

FIG. 1 schematically illustrates states of a cleaning person who cleans multiple toilet devices. In the example of FIG. 1, the cleaning person moves around the facility to clean restrooms provided on the basement through the third floor. The cleaning person starts the cleaning work at 12 o'clock, and cleans one of the three toilets in the third-floor men's restroom first; since the remaining two toilets are occupied, the cleaning person moves to the third-floor women's restroom to clean the three toilets therein. Thereafter, the cleaning person goes back to the third-floor men's restroom to clean the urinals and sinks, and waits for the two uncleaned toilets to become vacant; however, since the two toilets are still occupied, the cleaning person moves to the second-floor women's restroom to clean the three toilets therein. Subsequently, the cleaning person moves to the second-floor men's restroom to clean the urinals and sinks, and, since the three toilets are all occupied, the cleaning person waits for any of them to become vacant; since one of them becomes vacant, the cleaning person cleans the toilet. Thereafter, since the remaining two toilets are still occupied, the cleaning person goes back to the third-floor men's restroom; since one of the uncleaned toilets therein is vacant, the cleaning person cleans the toilet. Subsequently, the cleaning person waits for the other uncleaned toilet to become vacant; however, since it is still occupied, the cleaning person moves to the second-floor men's restroom and cleans one of the toilets therein. Since the remaining two toilets are occupied, the cleaning person moves to the first-floor women's restroom to clean the three toilets therein. Thereafter, the cleaning person moves to the first-floor men's restroom to clean the urinals and sinks; since the three toilets therein are all occupied, without waiting for them to become vacant, the cleaning person goes back to the third-floor men's restroom to check if the uncleaned toilet is vacant. However, since the uncleaned toilet is not vacant, the cleaning person waits for a while; since it remains occupied, the cleaning person resignedly moves to the second-floor men's restroom to check if the uncleaned toilet is vacant. However, since the uncleaned toilet is not vacant either, the cleaning person waits for a while; since it remains occupied, the cleaning person moves to the first-floor men's restroom.

Thus, a cleaning person has been conventionally unable to get to know in advance which toilet device is vacant among toilet devices in multiple restrooms to be cleaned by the cleaning person. Accordingly, the cleaning person has needed to actually enter the restrooms to clean a toilet device vacant at the time, so that unnecessary waiting time or moving time could be caused depending on the use status of the toilet devices.

In response to the above issue, in the present embodiment, information indicating the use status of multiple toilet devices to be cleaned by a cleaning person is collected and provided to the cleaning person. This can improve the efficiency of cleaning multiple toilet devices, thereby also improving the convenience of the cleaning person. Also, improving the cleaning efficiency can reduce the frequency of the cleaning person's occupying a restroom and the time required for the occupancy, thereby also improving the convenience of users. Also, since the time required for the cleaning work can be reduced, the cost required for the maintenance of the toilet devices can also be reduced. Further, when the information indicating the use status of multiple toilet devices is provided to users, each user can get to know the use status of a restroom before use, so that the convenience of users can be improved.

Figure 2:
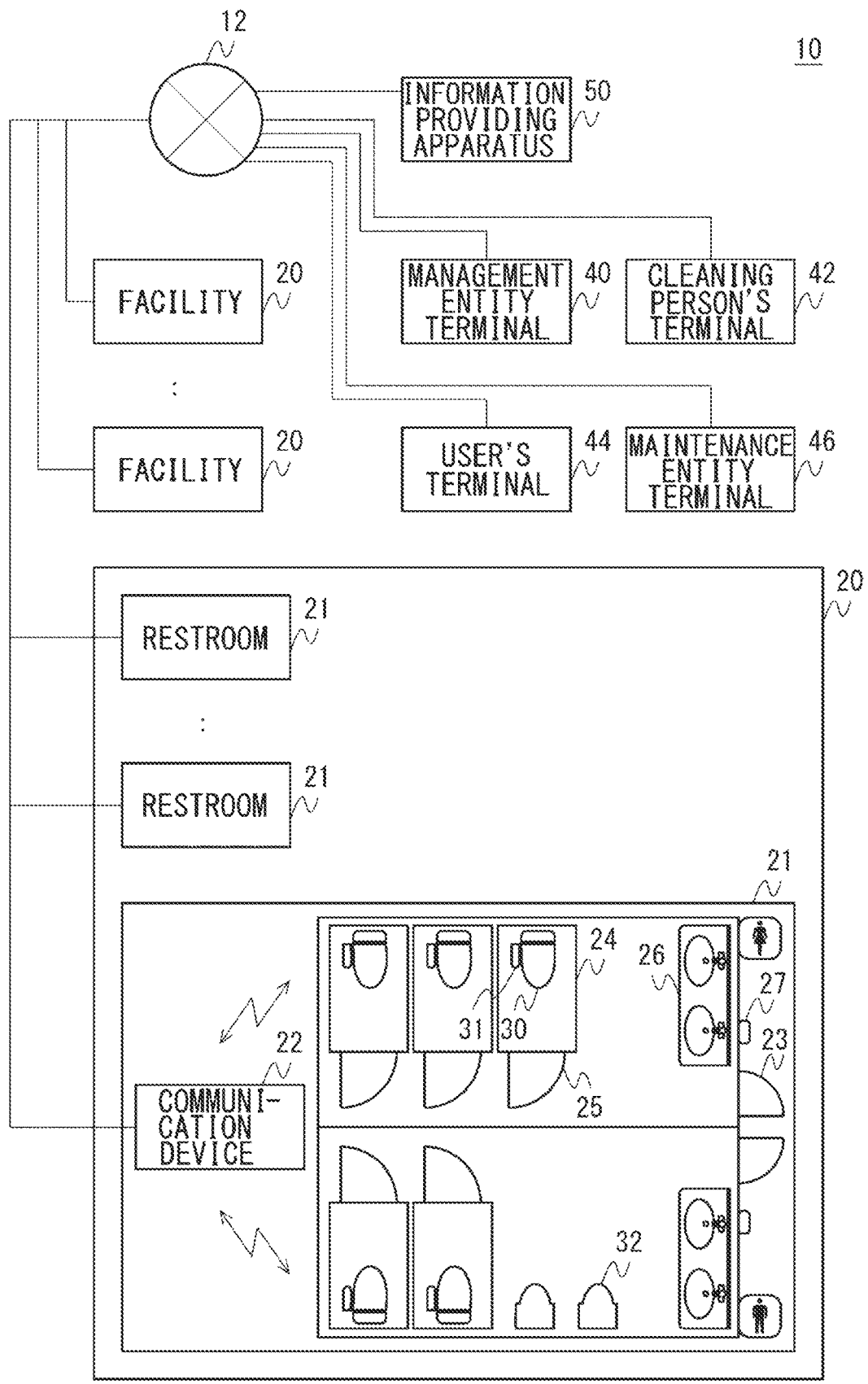
FIG. 2 is a diagram that illustrates a configuration of an information providing system according to an embodiment.

FIG. 2 illustrates a configuration of an information providing system according to the embodiment. An information providing system 10 includes multiple toilet devices 30 installed in a restroom 21 of a facility 20, an information providing apparatus 50 that provides information regarding the use status of the multiple toilet devices 30, a communication device 22 that transmits the information regarding the use status of the multiple toilet devices 30 to the information providing apparatus 50, a management entity terminal 40 for the entity that manages the facility 20 in which the restroom 21 is provided, a cleaning person's terminal 42 for a cleaning person in charge of cleaning the restroom 21, a user's terminal 44 for a user who uses the restroom 21, a maintenance entity terminal 46 for the entity in charge of maintenance of equipment or devices installed in or around the toilet devices 30 or the restroom 21, and the Internet 12 as an example of communication means used for communication among the apparatus, devices, and terminals.

In the facility 20, at least one restroom 21 is provided. The restroom 21 is provided with a door 23 of the restroom 21, a sink unit 26, at least one stall 24, a door 25 of each stall 24, a toilet device 30 installed in each stall 24, a controller 31 into which a user of a toilet device 30 inputs an operating instruction for the toilet device 30, a urinal 32 installed in a restroom 21 for men, and a presentation device 27 that presents the use status of each toilet device 30 installed in the restroom 21. A toilet device 30 may be a Japanese-style toilet device or may be a Western-style toilet device. In the following, the toilet devices and the urinal 32 will be collectively referred to as the "toilet devices 30".

The information providing apparatus 50 provides, to the cleaning person's terminal 42 and the user's terminal 44, information indicating the use status of at least one toilet device 30 installed in at least one restroom 21 of at least one facility 20. As will be described later, the information providing apparatus 50 provides, as the information indicating the use status of a toilet device 30, information indicating use duration, estimated time required until the termination of use, and the like. To the cleaning person's terminal 42, the information providing apparatus 50 further provides information indicating the order in which multiple toilet devices 30 are to be cleaned, information indicating whether or not cleaning of each toilet device 30 has been completed, and the like. To the user's terminal 44, the information providing apparatus 50 further provides information indicating a toilet device 30 that is under cleaning or scheduled to be cleaned within a predetermined period of time, for example. Accordingly, the convenience of cleaning persons and users can be improved. When the information providing apparatus 50 acquires information regarding management or maintenance of a toilet device 30 from the cleaning person's terminal 42 or the user's terminal 44, the information providing apparatus 50 provides the information thus acquired to the management entity terminal 40 or the maintenance entity terminal 46. The information providing apparatus 50 may provide information indicating the use status of toilet devices 30 installed in multiple restrooms 21 of a facility 20, or may provide information indicating the use status of toilet devices 30 installed in multiple restrooms 21 of multiple facilities 20. For example, when a cleaning company is commissioned by the manager of a facility 20 to clean the restrooms 21 of the facility 20, the information providing apparatus 50 provides, to the cleaning person's terminal 42, information indicating the use status of the toilet devices 30 installed in the multiple restrooms 21 of the facility 20. This can improve the convenience of a cleaning person who moves around the facility 20 to clean the multiple restrooms 21. Meanwhile, when a cleaning company is commissioned by the manager of a retailer or a restaurant company having multiple stores or restaurants to clean the restrooms 21 of multiple stores or restaurants, the information providing apparatus 50 provides, to the cleaning person's terminal 42, information indicating the use status of the toilet devices 30 installed in the restrooms 21 of the multiple stores or restaurants operating in multiple facilities 20. This can improve the convenience of a cleaning person who moves around the multiple facilities 20 to clean the multiple restrooms 21 provided therein.

Figure 3:
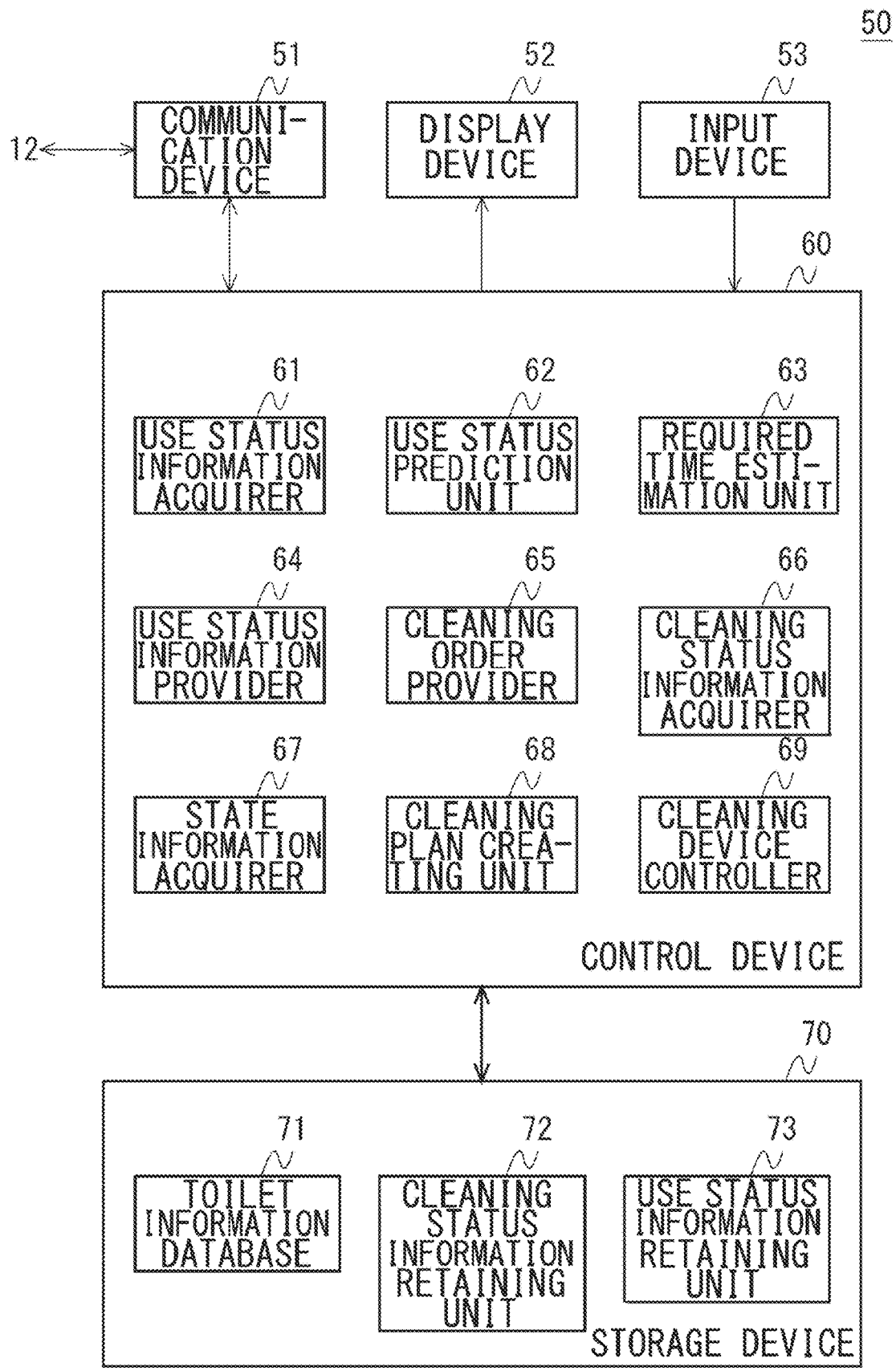
FIG. 3 is a diagram that illustrates a configuration of an information providing apparatus according to the embodiment.

FIG. 3 illustrates a configuration of the information providing apparatus 50 according to the embodiment. The information providing apparatus 50 includes a communication device 51, a display device 52, an input device 53, a storage device 70, and a control device 60. The information providing apparatus 50 may be a server device, a personal computer, or other device, or may be a mobile terminal, such as a cellular phone terminal, a smartphone, and a tablet terminal.

The communication device 51 controls communication with other devices. The communication device 51 may perform communication using an arbitrary wired or wireless communication scheme. The communication device 51 communicates with the communication device 22 via the Internet 12 to receive use status information of a toilet device 30 and transmit an instruction or information for a toilet device 30, for example. The communication device 51 also communicates, via the Internet 12, with the management entity terminal 40, the cleaning person's terminal 42, the user's terminal 44, and the maintenance entity terminal 46.

The display device 52 displays a screen generated by the control device 60. The display device 52 may be a liquid crystal display device, an organic EL display device, or the like. The input device 53 transmits, to the control device 60, an instruction input by a user of the information providing apparatus 50. The input device 53 may be a mouse, a keyboard, a touch pad, or the like. The display device 52 and the input device 53 may be implemented as a touch panel.

The storage device 70 stores programs, data, and the like used by the control device 60. The storage device 70 may be semiconductor memory, a hard disk, or the like. The storage device 70 includes a toilet information database 71, a cleaning status information retaining unit 72, and a use status information retaining unit 73.

The toilet information database 71 stores information regarding the facilities 20, restrooms 21, and toilet devices 30. For example, the toilet information database 71 may store information including: the number of restrooms 21 provided in a facility 20 and the position and floor of each restroom 21; the number of stalls 24 provided in each restroom 21 and the position and state of each stall 24; the number of toilet devices 30 and the model, serial number, manufacture date, and state of each toilet device 30; a plan view of each restroom 21; and the types and the number of devices and equipment installed inside or outside each restroom 21 and the position and state of each device and equipment.

The cleaning status information retaining unit 72 retains information regarding the status of cleaning of a toilet device 30 performed by a cleaning person. The cleaning status information retaining unit 72 retains, for each toilet device 30, status information that indicates the status of cleaning of the toilet device 30. The status information may be information indicating "uncleaned", "to be cleaned within a predetermined time", "under cleaning", or "cleaned", for example. The cleaning status information retaining unit 72 may further retain information including an estimated cleaning start time and estimated time required until the completion of cleaning, for example.

The use status information retaining unit 73 stores the use status information received from the communication device 22 installed in a restroom 21 of a facility 20. The use status information retaining unit 73 stores the use status information received from each communication device 22 and related to the received date and time. The use status information retaining unit 73 also stores, for each toilet device 30, use duration from the start of use of the toilet device 30, and estimated time required until the termination of use of the toilet device 30.

The control device 60 includes a use status information acquirer 61, a use status prediction unit 62, a required time estimation unit 63, a use status information provider 64, a cleaning order provider 65, a cleaning status information acquirer 66, a state information acquirer 67, a cleaning plan creating unit 68, and a cleaning device controller 69. Each of these configurations may be implemented by a CPU or memory of any given computer, an LSI, or the like in terms of hardware, and by a memory-loaded program or the like in terms of software. In the present embodiment are shown functional block configurations realized by cooperation thereof. Therefore, it will be understood by those skilled in the art that these functional blocks may be implemented in a variety of forms by hardware only, a combination of hardware and software, or the like.

The use status information acquirer 61 acquires, from the communication device 22, the use status information of a toilet device 30 installed in a restroom 21 of a facility 20 and stores the use status information in the use status information retaining unit 73. As the use status information of a toilet device 30, the use status information acquirer 61 acquires: information indicating the use state of the toilet device 30; information indicating the operation status of the controller 31; information indicating the open or closed state of the door 23 of the restroom 21 or the door 25 of the stall 24 detected by an opening/closing sensor provided on the door; information indicating the use status or state of equipment or a device, such as a light, a ventilating fan, and a toilet-paper holder, provided inside or outside the restroom 21; information detected by a sensor provided inside or outside the restroom 21, such as a human detection sensor, a temperature sensor, and an odor sensor; information detected by a sensor provided in the toilet device 30, such as a sitting sensor, a temperature sensor, and a water level sensor; an image captured by an imaging device provided inside or outside the restroom 21; and audio acquired by a microphone provided inside or outside the restroom 21. Based on the use status information thus acquired, the use status information acquirer 61 judges whether or not the toilet device 30 is occupied, and, when it is judged to be occupied, the use status information acquirer 61 calculates the use duration from the start of use.

The use status prediction unit 62 predicts future use status of a toilet device 30. The use status prediction unit 62 predicts a time variation in the congestion state of a toilet device 30 and the use duration of the toilet device 30, based on the type of the facility in which the toilet device 30 is installed (an office building, a commercial facility, a stadium, or an accommodation facility, for example), the scale, area, and floor space of the facility, the density of toilet devices 30 with respect to the number of users, the male-to-female ratio and the age distribution of facility users, the type of the restroom 21 (a men's restroom, a women's restroom, a multipurpose restroom, whether or not a private part washing device is provided, and whether or not a baby seat or a crib is provided, for example), the types of facilities and stores located around the restroom 21 (restaurants, clothing stores, and the like), and the number of such facilities and stores, for example. The use status prediction unit 62 may also predict a time variation in the congestion state and the use duration of a toilet device 30, based on the past use results of the toilet device 30, the current use status of the toilet device 30, and the current use status of the facility. For example, the time variation in the congestion state or the use duration of the toilet device 30 may be predicted by calculating an average value, a weighted average value, an intermediate value, and a median value of the degree of congestion or the use duration of the toilet device 30 in the past. The use status prediction unit 62 may learn the past use results of a toilet device 30 by means of artificial intelligence. For example, in a neural network in which identification information of the toilet device 30, time periods, and the abovementioned parameters are set for the input layer, and the degree of congestion and the use duration of the toilet device 30 are set for the output layer, weights of an intermediate layer may be learned using the past use results of the toilet device 30.

The required time estimation unit 63 estimates time required until the use of an occupied toilet device 30 is terminated. The required time estimation unit 63 may estimate the time required until the termination of use by subtracting the current use duration of the toilet device 30 from the estimated use duration of the toilet device 30 predicted by the use status prediction unit 62. The required time estimation unit 63 may also estimate the time required until the termination of use based on the current use status of the toilet device 30. For example, when use of a baby seat is detected, a predetermined period of time may be added to the time required until the termination of use of the toilet device 30, which has been calculated based on the estimated use duration of the toilet device 30 predicted by the use status prediction unit 62.

The use status information provider 64 provides information indicating the use duration of each of multiple toilet devices 30 calculated by the use status information acquirer 61. In addition to or instead of the use duration, the use status information provider 64 may provide information indicating the time required until the termination of use, which has been estimated by the required time estimation unit 63. Accordingly, a cleaning person or a user can get to know in advance the use status of a toilet device 30, so that the situation can be reduced in which the cleaning person or user enters the restroom 21 but cannot clean or use the toilet device 30 because the toilet device 30 is occupied.

Based on the use duration of each of the multiple toilet devices 30, the cleaning order provider 65 determines the order in which cleaning of the multiple toilet devices 30 is to be performed by a cleaning person, and provides the order to the cleaning person's terminal 42. The cleaning order provider 65 may determine the cleaning order only based on the current use duration of each of the multiple toilet devices 30 or further based on the past use results, such as the number or times of use, of each toilet device 30 stored in the use status information retaining unit 73. When a cleaning person is in a restroom 21 and waits for an occupied toilet device 30 to become vacant, the cleaning order provider 65 judges whether the cleaning person should still wait there or should move to another restroom 21. The cleaning order provider 65 may judge whether the cleaning person should still wait or should move to another restroom 21 based on the time required until the termination of use of the toilet device 30, the number of times of use of a toilet device 30 in another restroom 21 for a past predetermined period, the current use status and predicted future use status of the toilet device 30 in the another restroom 21, whether or not cleaning of the toilet device 30 in the another restroom 21 has been completed, and the time required for moving to the another restroom 21, for example. When the cleaning person is not in a restroom 21, the cleaning order provider 65 acquires information indicating the current position of the cleaning person from the cleaning person's terminal 42, and provides information of a toilet device 30 currently vacant or a toilet device 30 of which use is projected to terminate before the cleaning person arrives at the restroom 21, among toilet devices 30 located around the current position of the cleaning person. The cleaning order provider 65 may preferentially select a restroom 21 that includes the largest total number of toilet devices 30 currently vacant and toilet devices 30 projected to become vacant before the arrival of the cleaning person. The cleaning order provider 65 may also preferentially select a restroom 21 in which all the toilet devices 30 installed therein are currently vacant or projected to become vacant before the arrival of the cleaning person. Accordingly, the cleaning efficiency can be improved.

On the presentation device 27 of a restroom 21 in which a toilet device 30 scheduled to be cleaned next by a cleaning person is installed, the cleaning order provider 65 may present information indicating that the toilet device 30 is scheduled to be cleaned. Upon confirming that the cleaning person has accepted the proposal, provided to the cleaning person's terminal 42, regarding the toilet device 30 scheduled to be cleaned next, the cleaning order provider 65 may present the information indicating that the toilet device 30 is scheduled to be cleaned, on the presentation device 27 of the restroom 21 in which the toilet device 30 is installed. The cleaning order provider 65 may also present a scheduled cleaning start time and estimated required time on the presentation device 27. The cleaning order provider 65 may issue an instruction not to use a toilet device 30 scheduled to be cleaned within a predetermined period of time, or may issue an instruction to set the lock of the door 25 of the stall 24 scheduled to be cleaned within a predetermined period of time or the door 23 of the restroom 21. On the presentation device 27, information indicating the position of a restroom 21 located in the vicinity, the use status of toilet devices 30 in the restroom 21 located in the vicinity, and the like may be further presented.

The cleaning status information acquirer 66 acquires information indicating the status of cleaning of multiple toilet devices 30 performed by a cleaning person and stores the information in the cleaning status information retaining unit 72. The use status information provider 64 further provides information indicating the status of cleaning of each of the multiple toilet devices 30. The information indicating the status of cleaning may be information that indicates whether or not the cleaning has been completed, the details of completed cleaning, and the like. Depending on the use status of the toilet devices 30, there may be a case where, before completing the cleaning of all the toilet devices 30 installed in a restroom 21, the cleaning person moves to another restroom 21, as illustrated in FIG. 1.

Accordingly, it may be sometimes difficult for the cleaning person to memorize whether or not cleaning has been completed. Also, when multiple cleaning persons clean the multiple toilet devices 30, it may also be difficult to comprehend whether or not cleaning has been completed by other cleaning persons. The information providing apparatus 50 of the present embodiment provides, to a cleaning person, the information indicating whether or not cleaning of each toilet device 30 has been completed, thereby improving the convenience of the cleaning person and also reducing the situation where the cleaning person finishes the cleaning while an uncleaned toilet device 30 is left. The information indicating the status of cleaning may be acquired from the cleaning person's terminal 42, or may be acquired from an input device or the like provided on the toilet device 30 or in the restroom 21 via the communication device 22. The cleaning status information acquirer 66 may acquire the position information of the cleaning person's terminal 42 at predetermined time intervals and analyze the position and the sojourn time of the cleaning person, so as to automatically judge and acquire whether or not cleaning has been completed. For example, when a cleaning person stays in a stall 24 for a predetermined period of time or longer, it may be judged that the cleaning of the toilet device 30 installed in the stall 24 has been completed. The information indicating the status of cleaning of each of the multiple toilet devices 30 may be provided to the user's terminal 44. Accordingly, a user can find a toilet device 30 of which use will not be disturbed by cleaning, or a toilet device 30 that is clean as the cleaning thereof has been completed, so that the convenience of users can also be improved.

The state information acquirer 67 acquires information indicating the state of a toilet device 30 from the cleaning person's terminal 42 or the user's terminal 44 and stores the information in the toilet information database 71. The state information acquirer 67 may acquire information including the degree of dirt of the toilet device 30 or whether there is a problem in the toilet device 30. When the state information acquirer 67 acquires information indicating that repair or replacement of a toilet device 30 may be required, the state information acquirer 67 may notify the management entity terminal 40 of the manager of the facility in which the toilet device 30 is installed or the maintenance entity terminal 46 of the maintenance entity. The state information acquirer 67 may acquire the position information of the cleaning person's terminal 42 at predetermined time intervals and analyze the position and the sojourn time of the cleaning person, so as to automatically judge and acquire the state of a toilet device 30. For example, when a cleaning person stays in a stall 24 for a predetermined period of time or longer, it may be judged that the degree of dirt of the toilet device 30 installed in the stall 24 is high.

Based on the information indicating the past use status of each of multiple toilet devices 30 retained in the use status information retaining unit 73, the cleaning plan creating unit 68 creates an implementation plan of the next or subsequent cleaning of the multiple toilet devices 30. The cleaning plan creating unit 68 may create an implementation plan of cleaning such that the toilet devices 30 can be cleaned within a time period in which the restroom 21 is less congested. The cleaning plan creating unit 68 may employ artificial intelligence learning using, as learning data, the information indicating the past use status of each of the multiple toilet devices 30. For example, by reinforcement learning, an algorithm for creating an optimal cleaning plan may be learned. In this case, the reinforcement learning may be performed using a reward value in which the conditions of the waiting time being shorter, the entire required time being shorter, and the travel distance being smaller are considered. The cleaning plan creating unit 68 may acquire information indicating the status of cleaning performed by a cleaning person based on the provided cleaning plan, evaluate whether or not the cleaning plan is appropriate based on the waiting time, the entire required time, and the travel distance, and learn an algorithm for creating a cleaning plan also using the evaluation results. This can improve the cleaning efficiency.

The cleaning plan creating unit 68 may determine the timing or frequency of cleaning based on the information indicating the use status of a toilet device 30 from the previous cleaning to the current time. This can improve the cleaning efficiency while maintaining an appropriate state of the toilet device 30. The cleaning plan creating unit 68 may make an index of the degree of dirt of a toilet device 30 based on the frequency of use of the toilet device 30 (such as the number of times of flushing, the number of times of sitting, the sitting duration, the number of times of using a warm-water washing toilet seat, the used amount of toilet paper, and the number of times of opening or closing the door 25 of the stall 24) from the previous cleaning to the current time, information indicating the state of the toilet device 30 acquired from a cleaning person at the time of the previous cleaning, and information indicating the state of the toilet device 30 acquired from a user at the time of the previous cleaning or later. Based on the index of the degree of dirt thus made, the cleaning plan creating unit 68 may create a cleaning plan. Also, the degree of dirt of the toilet device 30 in the future may be predicted based on attribute information, such as the type of the facility, an attribute of the users of the toilet device 30, the type of the toilet device 30, and the time period, and the degree of dirt of the toilet device 30 in the past. Based on the degree of dirt thus predicted, a cleaning plan may be created. In consideration of the type of the facility, an attribute of the users of the toilet device 30, the type of the toilet device 30, and an instruction from the manager of the facility, for example, the cleaning plan creating unit 68 may create a cleaning plan based on the latest use status of the toilet device 30, a predicted degree of dirt in the future, and the like, so as to maintain the required cleanliness. The cleaning plan creating unit 68 provides the cleaning plan thus created to a cleaning person. The cleaning plan creating unit 68 may provide information of a toilet device 30 to be cleaned to a cleaning person who is cleaning, may propose the order of cleaning in a single cleaning process, or may propose the frequency of cleaning. Accordingly, the cleaning person can perform cleaning appropriate for the use status, so that the cleaning efficiency can be improved while the toilet devices 30 can be kept clean.

Based on the cleaning plan created by the cleaning plan creating unit 68, the cleaning device controller 69 controls a cleaning device used to perform cleaning of the multiple toilet devices 30. The cleaning device may be an automatic cleaning device provided in each toilet device 30 or warm-water washing device, or may be a self-propelled cleaning device that automatically cleans each toilet device 30 while traveling between the multiple toilet devices 30 by automated driving. Accordingly, cleaning can be performed by the cleaning device at appropriate timing, so that the cleaning efficiency can be improved. When the cleaning device controller 69 acquires information indicating that the cleaning by the cleaning device is insufficient from the cleaning device itself, a toilet device 30, or a peripheral device, for example, the cleaning device controller 69 may notify the cleaning person's terminal 42 that a cleaning person needs to clean the toilet device 30.

Figure 4:
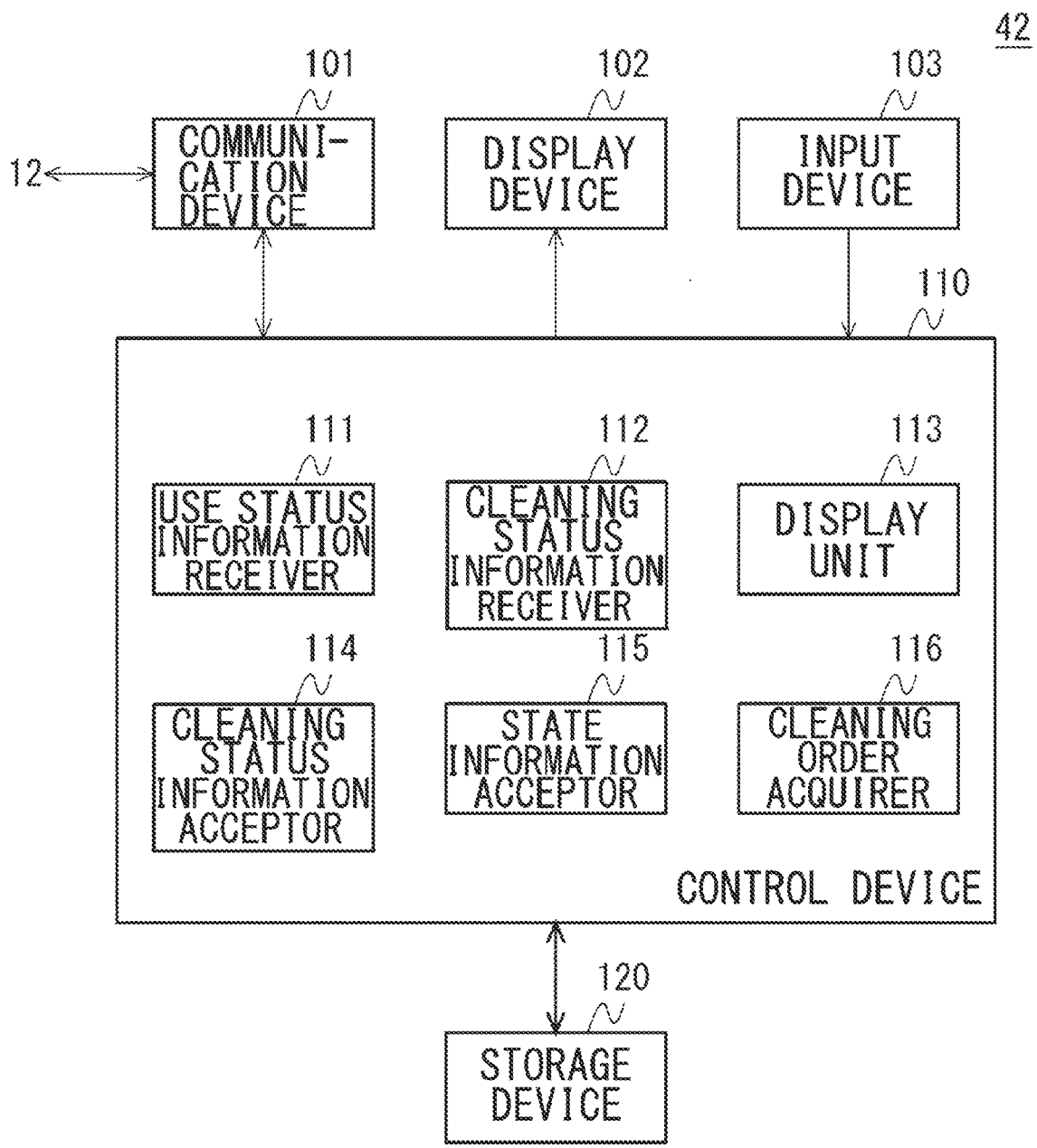
FIG. 4 is a diagram that illustrates a configuration of a cleaning person's terminal according to the embodiment.

FIG. 4 illustrates a configuration of the cleaning person's terminal 42 according to the embodiment. The cleaning person's terminal 42 includes a communication device 101, a display device 102, an input device 103, a storage device 120, and a control device 110. The cleaning person's terminal 42 may be a mobile terminal, such as a cellular phone terminal, a smartphone, and a tablet terminal.

The communication device 101 controls communication with other devices. The communication device 101 may perform communication using an arbitrary wired or wireless communication scheme. The communication device 101 communicates with the information providing apparatus 50 via the Internet 12 to transmit or receive information.

The display device 102 displays a screen generated by the control device 110. The display device 102 may be a liquid crystal display device, an organic EL display device, or the like. The input device 103 transmits, to the control device 110, an instruction input by a cleaning person. The input device 103 may be a mouse, a keyboard, a touch pad, or the like. The display device 102 and the input device 103 may be implemented as a touch panel.

The storage device 120 stores programs, data, and the like used by the control device 110. The storage device 120 may be semiconductor memory, a hard disk, or the like.

The control device 110 includes a use status information receiver 111, a cleaning status information receiver 112, a display unit 113, a cleaning status information acceptor 114, a state information acceptor 115, and a cleaning order acquirer 116. These functional blocks may also be implemented in a variety of forms by hardware only, a combination of hardware and software, or the like.

The use status information receiver 111 acquires the information indicating the use status of multiple toilet devices 30 from the information providing apparatus 50. The use status information receiver 111 acquires, from the information providing apparatus 50, information indicating the use duration of the multiple toilet devices 30, information indicating the time required until the use of an occupied toilet device 30 is terminated, and the like. The display unit 113 displays, on the display device 102, the information indicating the use duration of the multiple toilet devices 30, the information indicating the time required until the use of an occupied toilet device 30 is terminated, and the like thus acquired by the use status information receiver 111.

The cleaning status information acceptor 114 accepts, from a cleaning person, the information indicating the status of cleaning of the multiple toilet devices 30 performed by the cleaning person and transmits the information to the information providing apparatus 50. The state information acceptor 115 accepts state information, such as the degree of dirt of a toilet device 30 cleaned by the cleaning person, and transmits the state information to the information providing apparatus 50. The cleaning order acquirer 116 acquires, from the information providing apparatus 50, information indicating the order in which cleaning of the multiple toilet devices 30 is to be performed by the cleaning person. The cleaning status information receiver 112 acquires information indicating the status of cleaning of the multiple toilet devices 30 from the information providing apparatus 50. The display unit 113 displays, on the display device 102, the information indicating the order of cleaning acquired by the cleaning order acquirer 116, and the information indicating the status of cleaning of the multiple toilet devices 30 acquired by a cleaning status information acquirer 117.

Figure 5:
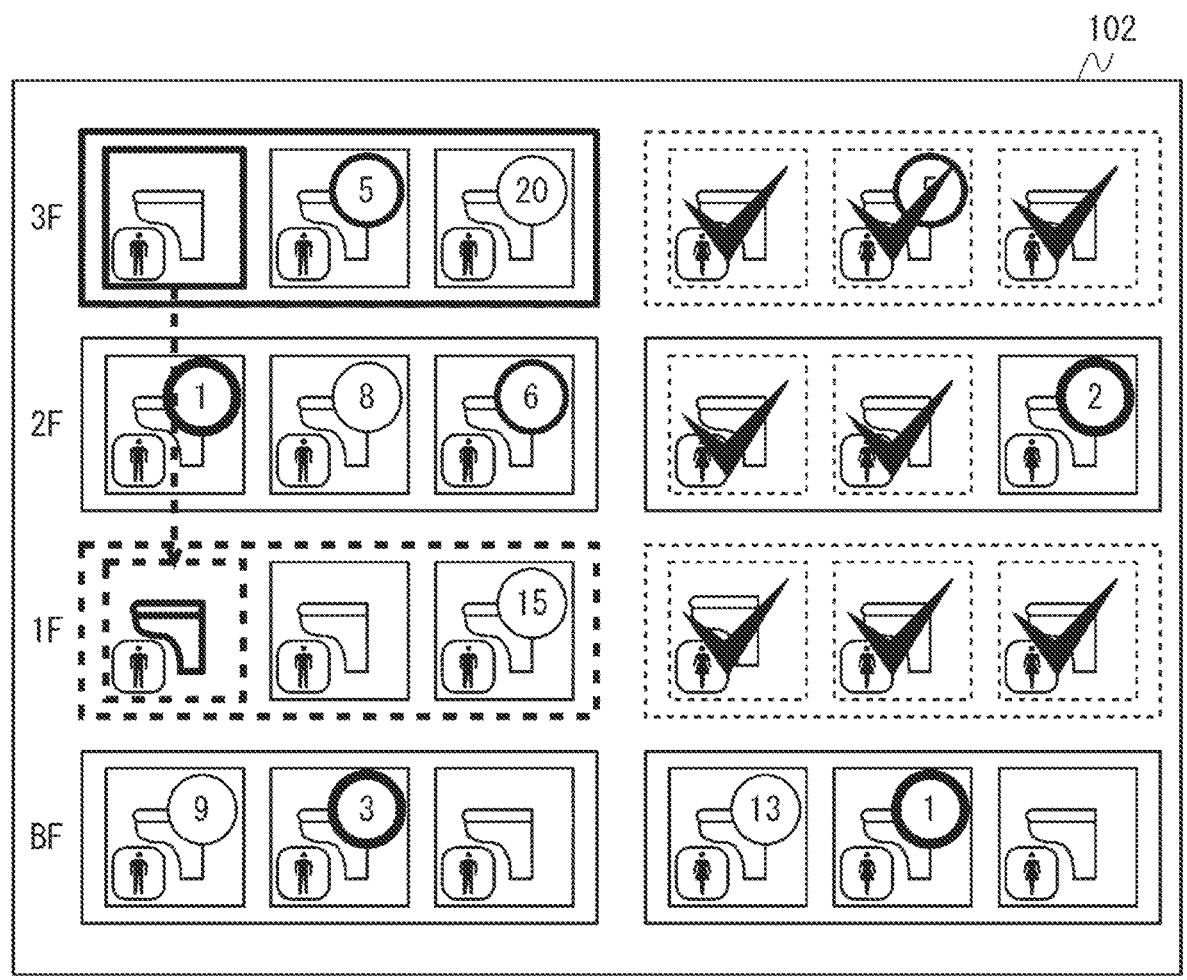
FIG. 5 is a diagram that illustrates an example of a screen displayed on a display device of the cleaning person's terminal.

FIG. 5 illustrates an example of a screen displayed on the display device 102 of the cleaning person's terminal 42. On the display device 102, multiple toilet devices 30 installed in the restrooms 21 provided on the basement through the third floor of the facility are listed, in which, for each occupied toilet device 30, a number that indicates the use duration from the start of use is displayed. With the line width of each circle encircling the number indicating the use duration, estimated time required until the termination of use is indicated. More specifically, a circle with thicker line width indicates that the estimated time required until the termination of use is longer. For each toilet device 30 of which cleaning has been completed by the cleaning person or another cleaning person, a check mark is displayed. The thick lines indicate that the cleaning person using the cleaning person's terminal 42 is currently cleaning a toilet device 30 in the third-floor men's restroom. Also, the thick dotted lines indicate that a toilet device 30 in the first-floor men's restroom is to be cleaned next.

Figure 6:
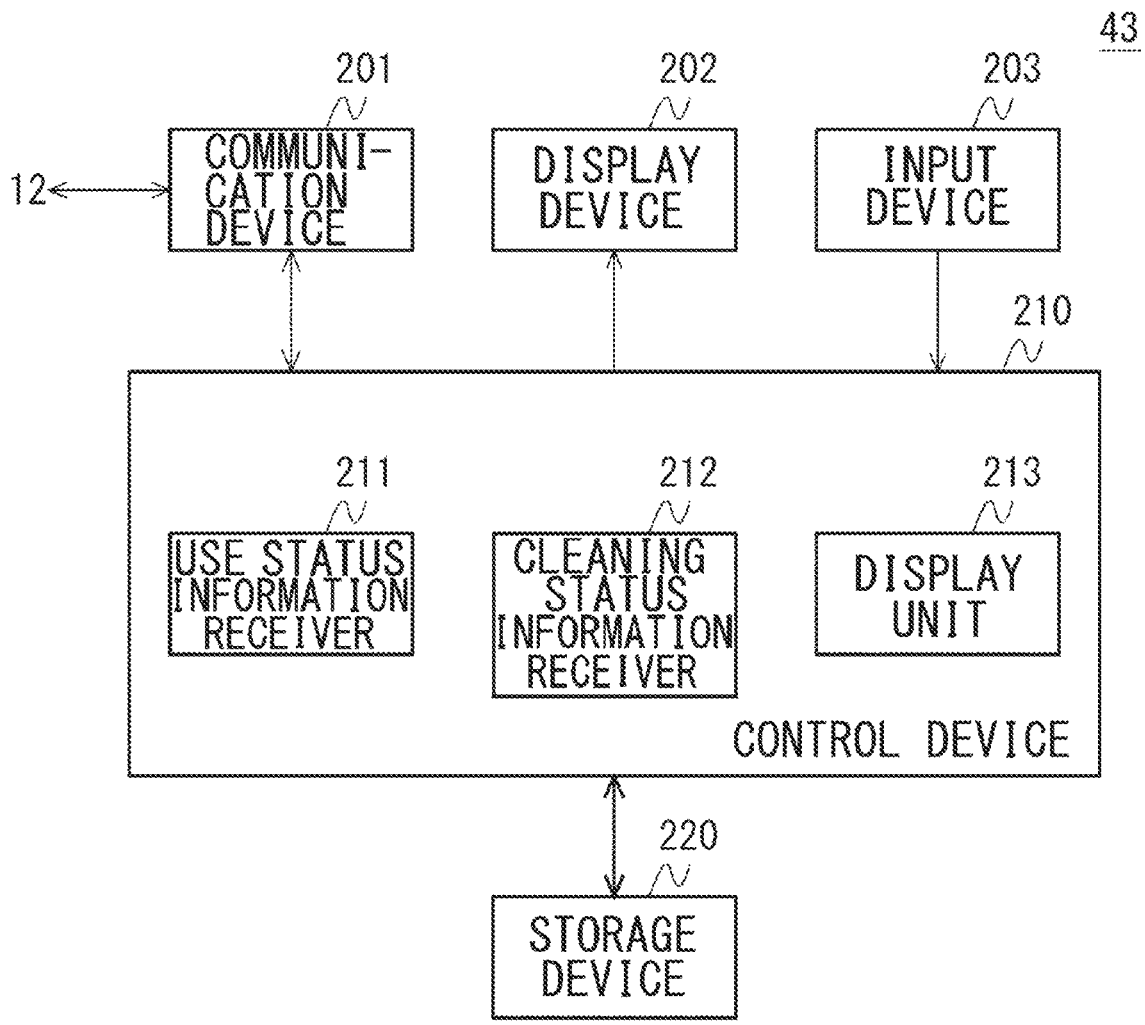
FIG. 6 is a diagram that illustrates a configuration of a user's terminal according to the embodiment.

FIG. 6 illustrates a configuration of the user's terminal 44 according to the embodiment. The user's terminal 44 includes a communication device 201, a display device 202, an input device 203, a storage device 220, and a control device 210. The user's terminal 44 may be a mobile terminal, such as a cellular phone terminal, a smartphone, and a tablet terminal.

The communication device 201 controls communication with other devices. The communication device 201 may perform communication using an arbitrary wired or wireless communication scheme. The communication device 201 communicates with the information providing apparatus 50 via the Internet 12 to transmit or receive information.

The display device 202 displays a screen generated by the control device 210. The display device 202 may be a liquid crystal display device, an organic EL display device, or the like. The input device 203 transmits, to the control device 210, an instruction input by a user. The input device 203 may be a mouse, a keyboard, a touch pad, or the like. The display device 202 and the input device 203 may be implemented as a touch panel.

The storage device 220 stores programs, data, and the like used by the control device 210. The storage device 220 may be semiconductor memory, a hard disk, or the like.

The control device 210 includes a use status information receiver 211, a cleaning status information receiver 212, and a display unit 213. These functional blocks may also be implemented in a variety of forms by hardware only, a combination of hardware and software, or the like.

The use status information receiver 211 acquires the information indicating the use status of multiple toilet devices 30 from the information providing apparatus 50. The use status information receiver 211 acquires, from the information providing apparatus 50, the information indicating the use duration of the multiple toilet devices 30, the information indicating the time required until the use of an occupied toilet device 30 is terminated, and the like. The display unit 213 displays, on the display device 202, the information indicating the use duration of the multiple toilet devices 30, the information indicating the time required until the use of an occupied toilet device 30 is terminated, and the like thus acquired by the use status information receiver 211.

The cleaning status information receiver 212 acquires the information indicating the status of cleaning of the multiple toilet devices 30 from the information providing apparatus 50. The display unit 213 displays, on the display device 202, the information indicating the status of cleaning of the multiple toilet devices 30 acquired by the cleaning status information receiver 212.

Figure 7:
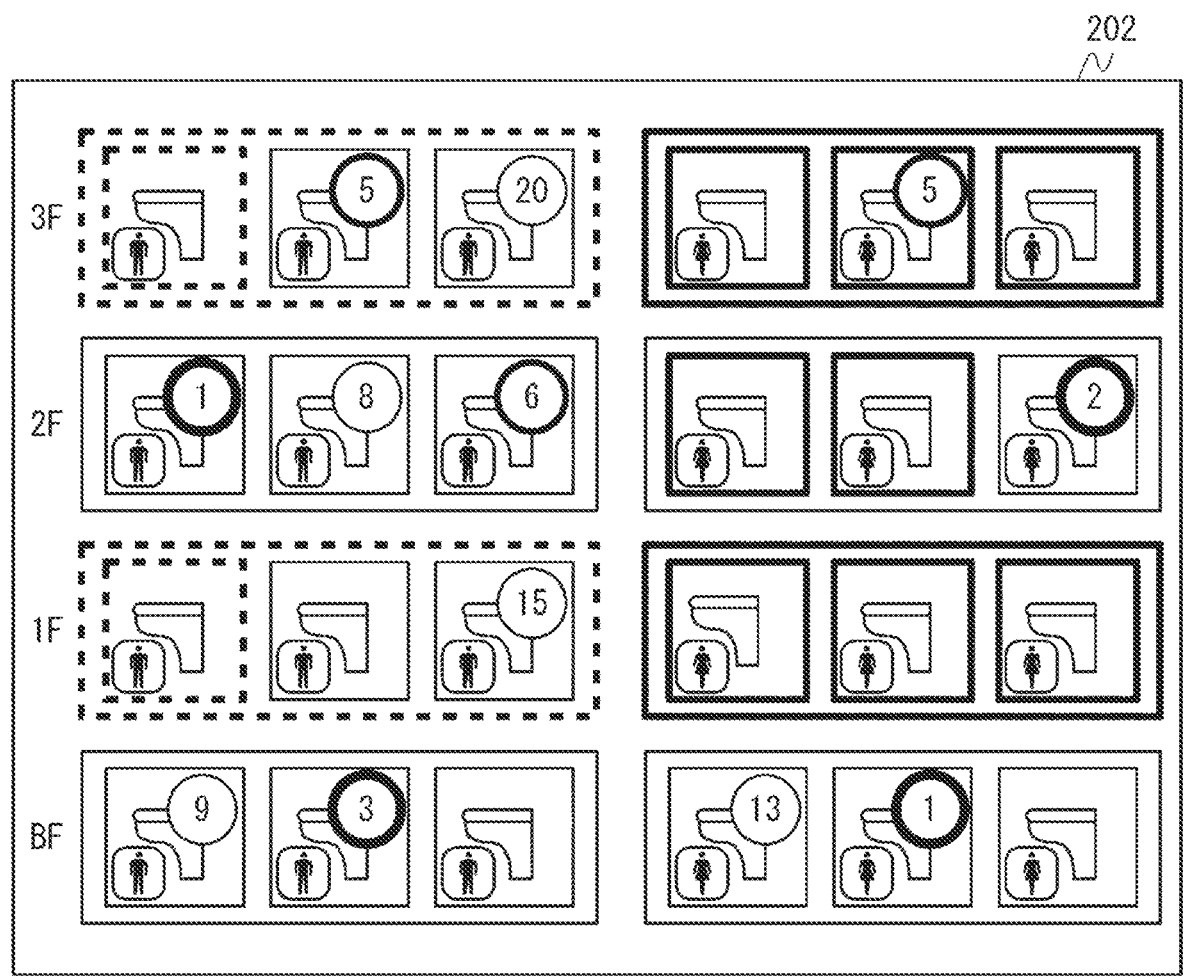
FIG. 7 is a diagram that illustrates an example of a screen displayed on a display device of the user's terminal.

FIG. 7 illustrates an example of a screen displayed on the display device 202 of the user's terminal 44. On the display device 202, multiple toilet devices 30 installed in the restrooms 21 provided on the basement through the third floor of the facility are listed, in which, for each occupied toilet device 30, a number that indicates the use duration from the start of use is displayed. With the line width of each circle encircling the number indicating the use duration, estimated time required until the termination of use is indicated. More specifically, a circle with thicker line width indicates that the estimated time required until the termination of use is longer. The thick lines indicate toilet devices 30 already cleaned by a cleaning person. Also, the thick dotted lines indicate toilet devices 30 that are under cleaning or scheduled to be cleaned within a predetermined period of time.

With such a technology, a cleaning person or a user can get to know in advance the use status of a toilet device 30, so that the situation can be reduced in which the cleaning person or user enters the restroom 21 but cannot clean or use the toilet device 30 because the toilet device 30 is occupied. Accordingly, the convenience of cleaning persons or users can be improved. Also, since the cleaning efficiency can be improved, the cost required for management and maintenance can be reduced. Further, since the toilet devices 30 can be kept clean, the life of each toilet device 30 can be prolonged.

The present disclosure has been described with reference to an embodiment, which merely describes principles and applications of the present disclosure. Also, various modifications or changes in arrangement may be made to the embodiment without departing from the scope of ideas of the disclosure.

Although the embodiment describes an example of managing toilet devices installed in the restrooms of a facility, the technology of the present embodiment is also applicable to the cases of managing toilets in ordinary houses and managing public toilets installed in the parks and on the street, for example.

When the disclosures embodied by the embodiment and modification set forth above are generalized, the following technical ideas are derived.

An information providing apparatus according to one aspect of the present disclosure includes: a use status information acquirer that acquires information indicating use status of each of multiple toilet devices; a use status information provider that provides information indicating use status of each of the multiple toilet devices, acquired by the use status information acquirer; and a cleaning order provider that determines and provides order in which the multiple toilet devices are to be cleaned by a cleaning person, based on the use status of each of the multiple toilet devices. According to this aspect, a cleaning person and a user can precisely comprehend the use status and the cleaning order of toilet devices, so that the convenience of cleaning persons and users can be improved. Also, since a cleaning person can clean the toilet devices in appropriate order, the cleaning efficiency can be improved.

The use status information provider may provide information indicating use duration of the multiple toilet devices. The information providing apparatus may further include a required time estimation unit that estimates time required until the termination of use of an occupied toilet device. The use status information provider may provide information indicating the time required until the termination of use, estimated by the required time estimation unit. According to this aspect, cleaning persons and users can comprehend the use status of toilet devices more precisely, so that the convenience of the cleaning persons and users can be improved.

The information providing apparatus may further include a use status information retaining unit that retains information indicating use status of each of the multiple toilet devices. The required time estimation unit may estimate the time required until the termination of use of an occupied toilet device, based on information indicating past use status of each of the multiple toilet devices retained in the use status information retaining unit. According to this aspect, the time required until the termination of use of an occupied toilet device can be estimated more precisely, so that the convenience of cleaning persons and users can be improved.

The cleaning order provider may determine the order in which the plurality of toilet devices are to be cleaned by the cleaning person, further based on the time required until the termination of use, estimated by the required time estimation unit. According to this aspect, more appropriate cleaning order can be determined, so that the cleaning efficiency can be further improved.

The information providing apparatus may further include a cleaning status information acquirer that acquires information indicating status of cleaning of the multiple toilet devices performed by the cleaning person. The use status information provider may further provide information indicating status of cleaning of each of the multiple toilet devices. According to this aspect, a cleaning person can get to know whether or not cleaning has been completed, and a user can get to know whether or not a toilet device can be used, so that the convenience of cleaning persons and users can be improved.

The use status information provider may distinguishably provide information of a toilet device of which cleaning has been completed. According to this aspect, a cleaning person can find an uncleaned toilet device, so that the convenience of cleaning persons can be improved. Also, since a user can find a toilet device of which use will not be disturbed by cleaning, the convenience of users can also be improved.

The use status information provider may distinguishably provide information of a toilet device that is under cleaning or scheduled to be cleaned within a predetermined period of time. According to this aspect, a user can find a toilet device that cannot be used or of which use may be disturbed because of cleaning, so that the convenience of users can be improved.

The information providing apparatus may further include a cleaning plan creating unit that creates an implementation plan of the next or subsequent cleaning of the multiple toilet devices, based on information indicating past use status of each of the multiple toilet devices retained in the use status information retaining unit. According to this aspect, cleaning can be performed appropriately for the use status, so that the cleaning efficiency can be improved while the toilet devices can be kept clean.

The information providing apparatus may further include a state information acquirer that acquires information indicating states of the multiple toilet devices from the cleaning person. The cleaning plan creating unit may create an implementation plan of the next or subsequent cleaning of the multiple toilet devices, further based on the information indicating the states of the multiple toilet devices acquired by the state information acquirer. According to this aspect, cleaning can be performed appropriately for the states of the toilet devices, so that the cleaning efficiency can be improved while the toilet devices can be kept clean.

The information providing apparatus may further include a cleaning device controller that controls a cleaning device used to perform cleaning of the multiple toilet devices, based on a cleaning plan created by the cleaning plan creating unit. According to this aspect, cleaning can be performed by the cleaning device at appropriate timing, so that the cleaning efficiency can be improved.

An information providing program according to another aspect of the present disclosure causes a computer to function as: a use status information acquirer that acquires information indicating use status of each of multiple toilet devices; a use status information provider that provides information indicating use status of each of the multiple toilet devices, acquired by the use status information acquirer; and a cleaning order provider that determines and provides order in which the multiple toilet devices are to be cleaned by a cleaning person, based on the use status of each of the multiple toilet devices. According to this aspect, a cleaning person and a user can precisely comprehend the use status and the cleaning order of toilet devices, so that the convenience of cleaning persons and users can be improved. Also, since a cleaning person can clean the toilet devices in appropriate order, the cleaning efficiency can be improved.

An information providing program according to yet another aspect of the present disclosure causes a computer to function as: a use status information receiver that receives, from an information providing apparatus that provides information indicating use status of each of multiple toilet devices, the information indicating use status of each of the multiple toilet devices; a cleaning order receiver that acquires, from the information providing apparatus, information indicating order in which the plurality of toilet devices are to be cleaned by a cleaning person; and a display unit that displays, on a display device, the information indicating use status of each of the multiple toilet devices received by the use status information receiver, and the information indicating order in which the multiple toilet devices are to be cleaned received by the cleaning order receiver. According to this aspect, a cleaning person can precisely comprehend the use status and the cleaning order of toilet devices, so that the convenience of cleaning persons can be improved. Also, since a cleaning person can clean the toilet devices in appropriate order, the cleaning efficiency can be improved.

The information providing program may further cause a computer to function as a cleaning status information acceptor that accepts, from a cleaning person, information indicating status of cleaning of the multiple toilet devices performed by the cleaning person, and the display unit may further display, on the display device, information indicating status of cleaning of each of the multiple toilet devices. According to this aspect, a cleaning person can find an uncleaned toilet device, so that the convenience of cleaning persons can be improved.

An information providing program according to still yet another aspect of the present disclosure causes a computer to function as: a use status information receiver that receives, from an information providing apparatus that provides information indicating use status of each of multiple toilet devices, the information indicating use status of each of the multiple toilet devices; a cleaning status information receiver that receives, from the information providing apparatus, information indicating a toilet device that is under cleaning or scheduled to be cleaned within a predetermined period of time; and a display unit that displays, on a display device, the information indicating use status of each of the multiple toilet devices received by the use status information receiver, and the information indicating a toilet device that is under cleaning or scheduled to be cleaned within a predetermined period of time received by the cleaning status information receiver. According to this aspect, cleaning persons and users can comprehend the use status of toilet devices more precisely, so that the convenience of the cleaning persons and users can be improved.

The display unit may display, on the display device, information indicating use duration or time required until the termination of use of each of the multiple toilet devices. According to this aspect, cleaning persons and users can comprehend the use status of toilet devices more precisely, so that the convenience of the cleaning persons and users can be improved. The present disclosure is applicable to information providing apparatuses for providing information regarding toilets.

REFERENCE SIGNS LIST 10 information providing system
20 facility
21 restroom
22 communication device
27 presentation device
30 toilet device
42 cleaning person's terminal
44 user's terminal
50 information providing apparatus
61 use status information acquirer
62 use status prediction unit
63 required time estimation unit
64 use status information provider
65 cleaning order provider
66 cleaning status information acquirer
67 state information acquirer
68 cleaning plan creating unit
69 cleaning device controller
71 toilet information database
72 cleaning status information retaining unit
73 use status information retaining unit
111 use status information receiver
112 cleaning status information receiver
113 display unit
114 cleaning status information acceptor
115 state information acceptor
116 cleaning order acquirer
211 use status information receiver
212 cleaning status information receiver
213 display unit

The invention claimed is:
1. An information providing apparatus, comprising:
a use status information acquirer that acquires information indicating a use status including whether or not each of a plurality of toilet devices is occupied, wherein each toilet device of the plurality of toilet devices is located in a respective room of a plurality of respective rooms and on a respective floor of a plurality of respective floors, from at least one of an opening/closing sensor provided on a door of the respective room or a stall, a human detection sensor, a temperature sensor, an odor sensor, a camera, and a microphone provided inside or outside the respective room, a sitting sensor, a temperature sensor, and a water level sensor provided in the toilet device;

a use status information provider that provides information indicating whether or not each of the plurality of toilet devices is occupied, acquired by the use status information acquirer;
 a cleaning status information acquirer that acquires information indicating a cleaning status including whether each of the plurality of toilet devices is in a cleaning status state including: (a) uncleaned, (b) to be cleaned within a predetermined time, or (c) cleaned;
 a cleaning order provider that determines and provides an order in which the plurality of toilet devices are to be cleaned, based on whether or not each of the plurality of toilet devices is occupied, based on past use results including a number of times each of the plurality of toilet devices have been used, and based on the cleaning status state of each of the plurality of toilet devices;
 a terminal device comprising a display that displays a visualization of each of the plurality of toilet devices in each of the plurality of rooms on each of the plurality of floors, including a visual indication of a respective duration time of use of each toilet device, and including a visual indication of a toilet device to be cleaned next based on the order determined by the cleaning order provider, and including a visual indication of which of the plurality of toilet devices have been cleaned, have not been cleaned, and will be cleaned based on the cleaning status state of each of the plurality of toilet devices and based on the order determined by the cleaning order provider;
 and a cleaning device controller that controls one or more cleaning devices to clean the plurality of toilet devices based at least in part on the determined order in which the plurality of toilet devices are to be cleaned.

2. The information providing apparatus of claim 1, wherein the use status information provider provides information indicating a use duration of the plurality of toilet devices.

3. The information providing apparatus of claim 1, further comprising a required time estimation unit that estimates a time required until termination of use of an occupied toilet device, wherein
 the use status information provider provides information indicating the time required until termination of use, estimated by the required time estimation unit.

4. The information providing apparatus of claim 3, further comprising a use status information retaining unit that retains information indicating the use status of each of the plurality of toilet devices, wherein
 the required time estimation unit estimates the time required until termination of use of the occupied toilet device, based on information indicating a past use status of each of the plurality of toilet devices retained in the use status information retaining unit.

5. The information providing apparatus of claim 3, wherein the cleaning order provider determines the order in which the plurality of toilet devices are to be cleaned, further based on the time required until termination of use, estimated by the required time estimation unit.

6. The information providing apparatus of claim 1, further comprising a cleaning status information acquirer that acquires information indicating a status of cleaning of the plurality of toilet devices, wherein
 the use status information provider further provides information indicating the status of cleaning of each of the plurality of toilet devices.

7. The information providing apparatus of claim 6, wherein the use status information provider distinguishably provides information of a toilet device of which cleaning has been completed.

8. The information providing apparatus of claim 6, wherein the use status information provider distinguishably provides information of a toilet device that is under cleaning or scheduled to be cleaned within a predetermined period of time.

9. The information providing apparatus of claim 4, further comprising a cleaning plan creating unit that creates an implementation plan of the next or subsequent cleaning of the plurality of toilet devices, based on information indicating the past use status of each of the plurality of toilet devices retained in the use status information retaining unit.

10. The information providing apparatus of claim 9, further comprising a state information acquirer that acquires information indicating states of the plurality of toilet devices from a cleaning person, wherein
 the cleaning plan creating unit creates the implementation plan of the next or subsequent cleaning of the plurality of toilet devices, further based on the information indicating the states of the plurality of toilet devices acquired by the state information acquirer.

11. The information providing apparatus of claim 9, further comprising a cleaning device controller that controls a cleaning device used to perform cleaning of the plurality of toilet devices, based on a cleaning plan created by the cleaning plan creating unit.

12. A non-transitory computer-readable storage medium storing instructions configured to cause a computer to: by a use status information acquirer, acquire information indicating a use status including whether or not each of a plurality of toilet devices is occupied, wherein each toilet device of the plurality of toilet devices is located in a respective room of a plurality of respective rooms and on a respective floor of a plurality of respective floors, from at least one of an opening/closing sensor provided on a door of the respective room or a stall, a human detection sensor, a temperature sensor, and an odor sensor, a camera, and a microphone provided inside or outside the respective room, a sitting sensor, a temperature sensor, and a water level sensor provided in the toilet device;
 by a use status information provider, provide information indicating whether or not each of the plurality of toilet devices is occupied, acquired by the use status information acquirer; and
 by a cleaning status information acquirer, acquire information indicating a cleaning status including whether each of the plurality of toilet devices is in a cleaning status state including: (a) uncleaned, (b) to be cleaned within a predetermined time, or (c) cleaned;
 by a cleaning order provider, determine and provide an order in which the plurality of toilet devices are to be cleaned, based on whether or not each of the plurality of toilet devices is occupied, based on and past use results including a number of times each of the plurality of toilet devices have been used, and based on the cleaning status state of each of the plurality of toilet devices; by a terminal device comprising a display, display a visualization of each of the plurality of toilet devices in each of the plurality of rooms on each of the plurality of floors, including a visual indication of a respective duration time of use of each toilet device, and including a visual indication of a toilet device to be cleaned next based on the order determined by the cleaning order provider, and including a visual indication of which of the plurality of toilet devices have been cleaned, have not been cleaned, and will be cleaned based on the cleaning status state of each of the plurality of toilet devices and based on the order determined by the cleaning order provider; and by a cleaning device controller, controlling one or more cleaning devices to clean the plurality of toilet devices based at least in part on the determined order in which the plurality of toilet devices are to be cleaned.

13. A non-transitory computer-readable storage medium storing instructions configured to cause a computer to:

by a use status information receiver, receive, from an information providing apparatus that provides information indicating a use status of each of a plurality of toilet devices including whether or not each of a plurality of toilet devices is occupied, wherein each toilet device of the plurality of toilet devices is located in a respective room of a plurality of respective rooms and on a respective floor of a plurality of respective floors, wherein the information providing apparatus receives said information from at least one of an opening/closing sensor provided on a door of the respective room or a stall, a human detection sensor, a temperature sensor, and an odor sensor, a camera, and a microphone provided inside or outside the respective room, and a sitting sensor, a temperature sensor, and a water level sensor provided in the toilet device, the information indicating whether or not each of the plurality of toilet devices is occupied;

by a cleaning status information receiver, receive, from the information providing apparatus, information indicating a toilet device that is under cleaning or scheduled to be cleaned within a predetermined period of time;

by a cleaning order receiver, acquire, from the information providing apparatus, information indicating an order in which the plurality of toilet devices are to be cleaned, wherein the cleaning order determined based on whether or not each of the plurality of toilet devices is occupied and past use results including a number of times each of the plurality of toilet devices have been used;

by a cleaning device controller, controlling one or more cleaning devices to clean the plurality of toilet devices based at least in part on the determined order in which the plurality of toilet devices are to be cleaned; and by a display unit of a terminal device, display, on a display device, a terminal device comprising a display that displays a visualization of each of the plurality of toilet devices in each of the plurality of rooms on each of the plurality of floors, including a visual indication of a respective duration time of use of each toilet device, and including a visual indication of which of the plurality of toilet devices have been cleaned, have not been cleaned, and will be cleaned based on the cleaning status state of each of the plurality of toilet devices and based on the order determined by the cleaning order provider.

14. The non-transitory computer-readable storage medium of claim 13, wherein the instructions are further configured to cause the computer to:

by a cleaning status information acceptor, accept, from a cleaning person, information indicating a status of cleaning of the plurality of toilet devices performed by the cleaning person.

15. The non-transitory computer-readable storage medium of claim 13, wherein the instructions are configured to cause the computer to:

by a cleaning status information receiver, receive, from the information providing apparatus, information indicating a toilet device that is under cleaning or scheduled to be cleaned within a predetermined period of time; and by the display unit, display, on the display device, the information indicating the toilet device that is under cleaning or scheduled to be cleaned within the predetermined period of time received by the cleaning status information receiver, and the information indicating the order in which the plurality of toilet devices are to be cleaned received by the cleaning order receiver.

16. The non-transitory computer-readable storage medium of claim 13, wherein the instructions are further configured to cause the computer to, by the display unit, display, on the display device, information indicating a use duration or a time required until termination of use of each of the plurality of toilet devices.

17. The information providing apparatus of claim 2, further comprising a required time estimation unit that estimates a time required until termination of use of an occupied toilet device, wherein the use status information provider provides information indicating the time required until the termination of use, estimated by the required time estimation unit.

18. The information providing apparatus of claim 4, wherein the cleaning order provider determines the order in which the plurality of toilet devices are to be cleaned, further based on the time required until the termination of use, estimated by the required time estimation unit.

19. The information providing apparatus of claim 2, further comprising a cleaning status information acquirer that acquires information indicating a status of cleaning of the plurality of toilet devices, wherein the use status information provider further provides information indicating the status of cleaning of each of the plurality of toilet devices.

20. The information providing apparatus of claim 3, further comprising a cleaning status information acquirer that acquires information indicating a status of cleaning of the plurality of toilet devices, wherein the use status information provider further provides information indicating the status of cleaning of each of the plurality of toilet devices.

21. The information providing apparatus of claim 1, wherein acquiring information indicating the cleaning status comprises:

acquiring position information from the terminal at predetermined time intervals; and analyzing the position information and associated time information to automatically determine a cleaning status.

* * * * *